3,613,155
APPARATUS FOR STRETCHING THERMOPLASTIC
Dan E. Bloxsom, 5615 Rice Ave., Houston, Tex. 77036
Original application May 8, 1967, Ser. No. 636,850.
Divided and this application Apr. 7, 1969, Ser.
No. 856,865
Int. Cl. B29c 17/02
U.S. Cl. 18—1 FS
4 Claims

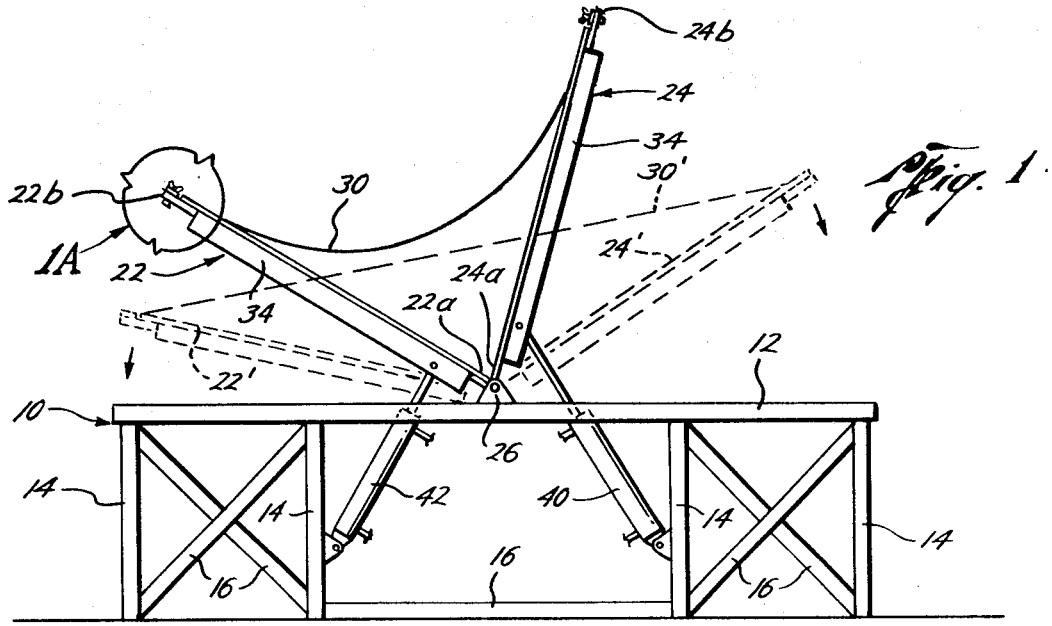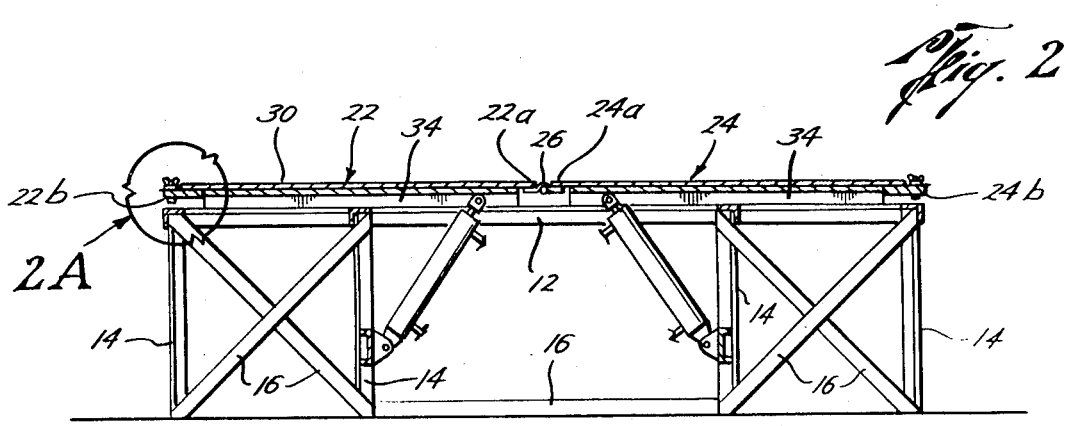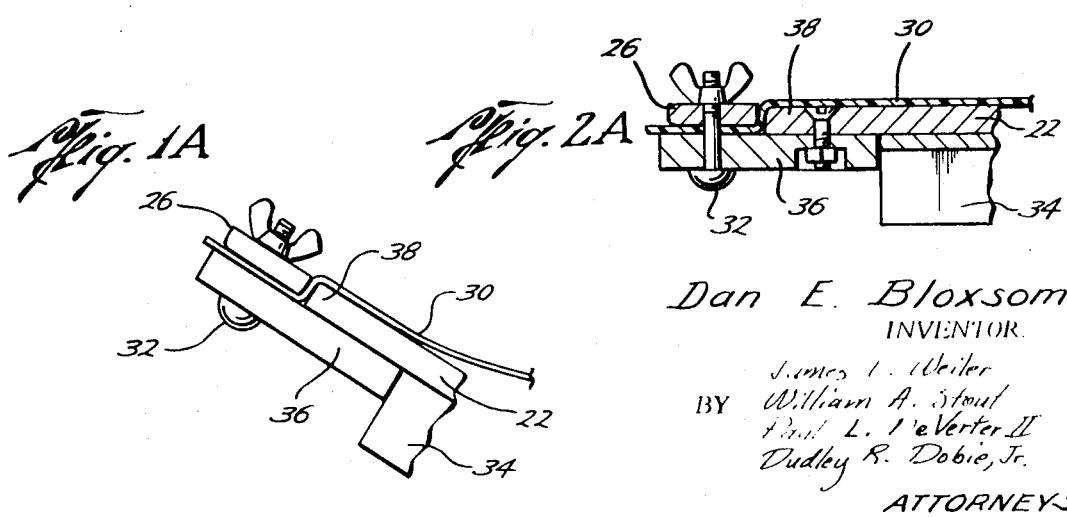

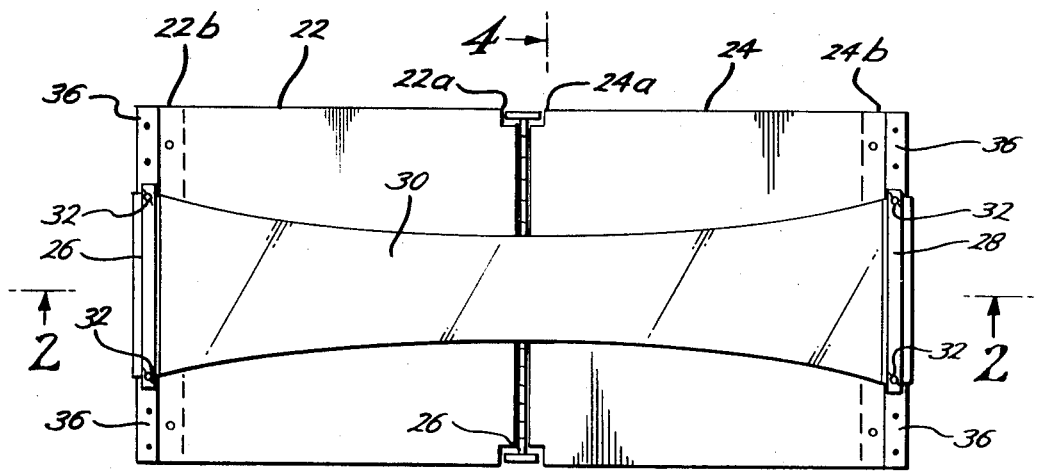
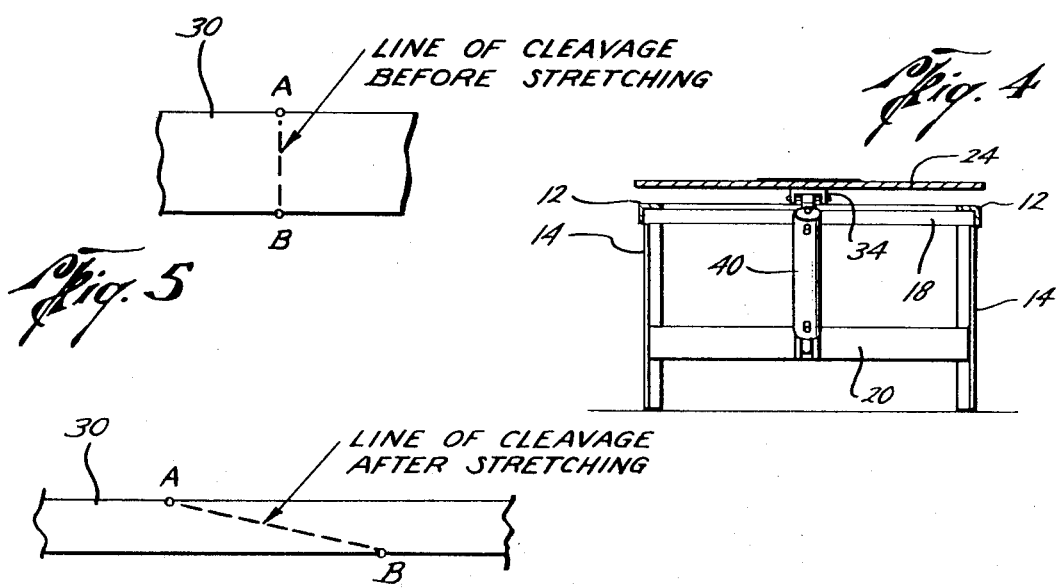
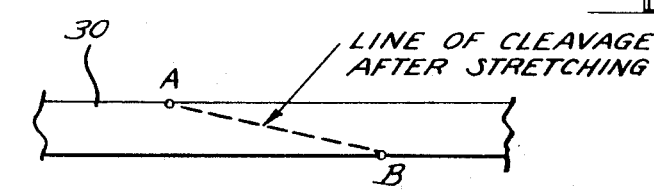

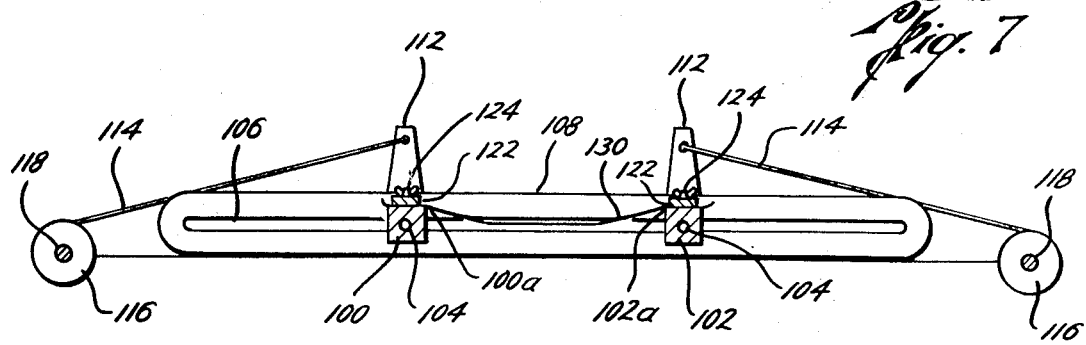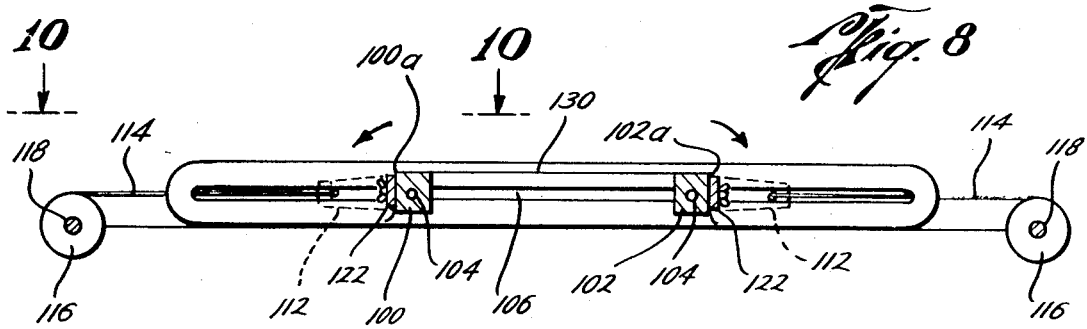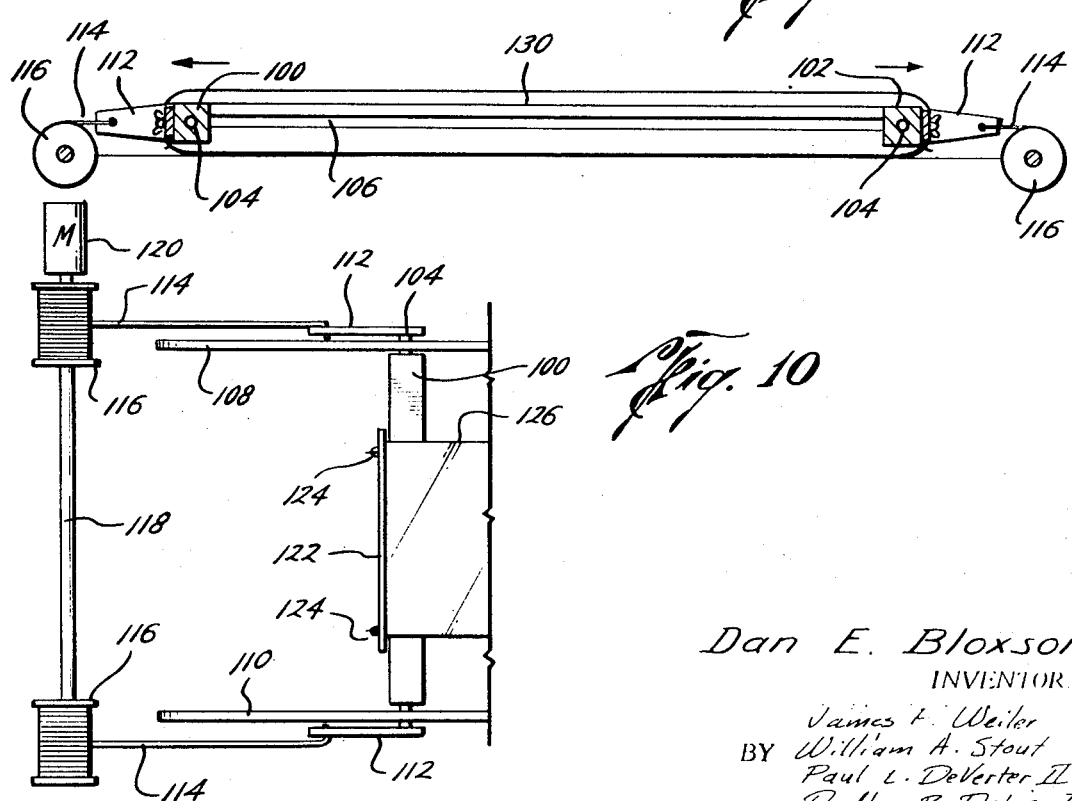

ABSTRACT OF THE DISCLOSURE

A method and apparatus for stretching a sheet of thermoplastic material to increase substantially the surface area thereof while simultaneously increasing strength of the material. In one embodiment, opposed ends of the sheet are supported and moved through an arcuate path in opposite directions until the ends are in a substantially horizontal coplanar relation. In another embodiment, opposed ends of the sheet are supported and rotated axially in opposite directions and then forced apart in opposite directions in coplanar relationship.

CROSS-REFERENCE TO RELATED APPLICATIONS

This application is a division of Ser. No. 636,850, filed May 8, 1967, now abandoned, and bearing the same title.

BACKGROUND OF THE INVENTION

It is highly advantageous in the manufacture of articles from sheets of thermoplastic material to increase the surface area of such sheet material. The advantages are at least twofold. First, cost per square foot of material decreases as surface area is increased through stretching of the sheet. Second, stretching of the material by the methods and apparatus of the present invention reorients the molecular structure of the sheet to increase strength and rigidity thereof.

In the past, attempts to stretch sheets of thermoplastic material have met with only limited success. As an illustration, current devices and methods for stretching thermoplastic material are generally capable of increasing surface area thereof only about 40%. Further stretching inevitably causes shearing of the sheet or otherwise deforms the material to such extent that it is unusable for most purposes contemplated. For example, the skylight manufacturing industry is a big consumer of thermoplastic sheet material wherein bubble-like shapes are formed which must be strong and which must have little or no optical distortion for visibility purposes.

SUMMARY OF THE INVENTION

The present invention is directed to methods and apparatuses for increasing surface area of a sheet of thermoplastic material. Moreover, the invention provides methods and apparatuses for stretching sheets of thermoplastic material to increase the surface area thereof at least 100% without shearing or distortion of the material while at the same time contributing significantly to increased strength of such material. The end result of the stretching action is a plastic sheet particularly suitable for manufacture or skylights or other such fabrication applications requiring rigidity as well as undegraded light transmission for visibility purposes.

It is, therefore, an object of the present invention to provide vastly improved methods for stretching thermoplastic material to at least double the surface area of such material while increasing the strength thereof without degrading the optical properties of such material.

A further object of the present invention is the provision of apparatuses for stretching a sheet of thermoplastic material which are readily adaptable for stretching various sizes of sheets to varying lengths.

Yet a further object of the present invention is the provision of a platform type of apparatus for stretching a sheet of thermoplastic material having first and second support members pivotally mounted on the platform with clamping means to secure the sheet to opposed ends of the support members in a downwardly stepped fashion wherein drive means are provided to move the support members in opposite directions through the vertical plane in timed relationship.

Another object of the present invention is the provision of a method for stretching a sheet of thermoplastic material by heating the sheet to the forming temperature of the material, supporting and vertically moving opposed ends of the sheet through an arcuate path wherein such ends are simultaneously moved in timed relationship through varying arcs in opposite directions.

Still another object of the present invention is the provision of a method and apparatus for "rollingly" stretching a sheet of thermoplastic material to substantially increase the surface area thereof wherein opposed ends of the sheet are supported and axially rotated in opposite directions and then forced apart in opposed directions in coplanar relationship.

Other and further objects, features and advantages will be apparent from the following description of a presently preferred embodiment of the invention, given for the purpose of disclosure, and taken in conjunction with the accompanying drawings.

DESCRIPTION OF THE DRAWINGS

In the drawings forming a part of the disclosure herein, like character references designate like parts throughout the several views wherein, FIG. 1 is an elevational view of one embodiment of the apparatus of the present invention showing a sheet of thermoplastic material supported thereon in the initial stages of the stretching operation, FIG. 1A is a partial side view illustrating means for supporting opposed ends of the thermoplastic sheet in the apparatus of FIG. 1, FIG. 2 is a cross-sectional elevational view of the same embodiment taken along line 2—2 of FIG. 3 illustrating later stages of the process of stretching a sheet of thermoplastic material, FIG. 2A is a partial cross-sectional view of the same clamping means as shown in FIG. 2, FIG. 3 is a plan representation showing the sheet of material in a stretched configuration, FIG. 4 is a cross-sectional end view taken along line 4—4 of FIG. 3, FIGS. 5 and 6 are graphical representations of lines of cleavage of the sheet of thermoplastic material before and after stretching according to the present invention, FIG. 7 is a cross-sectional elevational view of another embodiment of an apparatus for stretching a sheet of thermoplastic material according to the present invention, FIG. 8 is a view similar to that of FIG. 7 illustrating rotational action of the supported ends of the sheet, FIG. 9 is a view similar to FIG. 8 showing stretching action of the apparatus, and FIG. 10 is a partial plan view taken along line 10—10 of FIG. 8 illustrating support and rotation of the ends of the thermoplastic sheets.

DESCRIPTION OF THE PREFERRED EMBODIMENT

The present invention generally comprises methods and apparatus for stretching sheets of thermoplastic material to a substantially greater surface area and increased strengths without shearing than has been accomplished in the past. Stretching is accomplished in one embodiment by supporting opposed ends of the sheet of material and moving the ends in opposite directions along an arcuate path wherein one end moves in timed relation through a greater arc than does the other end. In a second embodiment, stretching is accomplished by supporting opposed ends of the sheet and rotating and moving the ends in opposite directions.

With reference now to FIG. 1 which illustrates one embodiment of an apparatus for effecting the present invention, a platform structure 10 is generally comprised of horizontal beams 12, legs 14, and trusses 16 bracing the legs. As shown in FIG. 4, cross-members 18 interconnect the horizontal beams and legs. Also secured between the legs 14 are horizontal cross-beams 20 on which are mounted power means as will be explained hereinafter.

Referring now to FIGS. 1 and 2, first and second support members 22 and 24 are pivotally secured at one end to the platform 10 by a suitable hinge 26. Thus, as shown in FIGS. 1 and 2, the ends 22a and 24a of the support members are adjacently spaced and pivotally secured to the platform 10.

The free ends 22b and 24b of the respective support members are capable of movement through the vertical plane and are provided with transverse clamping boards 26 and 28 respectively as better shown in FIG. 3. Opposed ends of the sheet of thermoplastic material 30 may thus be conformed with the free ends 22b and 24b of the support members 22 and 24 and held in place between the clamping boards 26 and 28 by a plurality of screws 32. Details of the support members and clamping boards are more clearly shown in FIGS. 1A and 2A and, although only the support member 22 is shown in FIGS. 1A and 2A, it is to be understood that the end 24b of the support member 24 is similarly constructed wherein each support member (22 as shown in FIGS. 1A and 2A) is mounted on a beam 34 for added rigidity. A transverse plate 36 is secured below the support member 22 to provide a type of stepped lap joint to receive the clamping board 26 releasably supported by the bolts 32. Thus a downward step 38 is provided outwardly of the support member 22 about which one end of the sheet of thermoplastic material 30 may be extended and secured between the clamping board 26 and the plate 36. The clamping board 26 thus acts as a type of elongate tenon to maintain the end of the sheet 30 within the stepped lap joint. It will be recognized that it will be desirable in most instances to augment the bolts 32 with suitable clamps (not shown) to further support and maintain the tenon or clamping board 26 in pressing engagement with the end of the sheet 30 against the plate 36.

With reference once again to FIG. 4, a hydraulic piston and cylinder device 40 is pivotally secured at one end to the cross-beam 20 and at the other end to the support beam 34 on which is mounted the support member 24. As shown in FIGS. 1 and 2, a similar hydraulic piston and cylinder arrangement 42 is provided for the support member 22. The hydraulic pistons 40 and 42 are well known to those skilled in the art and it will become apparent that other suitable power means also may be provided to drive the support members 22 and 24 for movement in the vertical plane.

Although not shown, the support members 22 and 24 may easily be constructed so as to telescope in length for quick adjustment to permit use with varying lengths of thermoplastic sheets or to vary the degree of stretch of particular sheets. Details of construction of such telescoping support members will be apparent to those skilled in the art.

In operation and with further reference to FIG. 1, a sheet of thermoplastic material 30 is heated to its "forming" temperature as is well known in the art and is secured at its opposed ends to the ends 22b and 24b of the support members 22 and 24. Of course, support is provided in placing the ends of the sheet about the downwardly stepped surface 38 of each support member (as shown in FIGS. 1A and 2A) and between the respective tenon or clamping boards 26 and 28 and plate 36 of each support member. The bolts 32 (and such augmenting clamps as are necessary) force the clamping boards 26 and 28 to securely engage the ends of the sheet 30 with the plates 36 of the support members 22 and 24.

The stretching operation now to be detailed is then carried out with rapidity while the thermoplastic sheet is at or above its forming temperature or else heat must be continuously applied to the sheet so that such forming temperature is maintained. For example, if the thermoplastic material is of the acrylic type, it must be heated to approximately 350° F. before stretching may be accomplished. It should be noted that prolonged contact of the heated thermoplastic sheet 30 with the support members other than at the ends 22b and 24b is to be avoided to prevent unintended cooling of the sheet. Erratic or preliminary cooling, especially uneven cooling, may cause distortion in the sheet during the stretching operation. Thus, it is preferable, for example, to connect one end of the sheet 30 to the end 24b of the support member 24 and elevate that end immediately as shown in FIG. 1. Then the opposed end of the sheet 30 may be connected to the end 22b of the other support member 22 and likewise elevated to the position as shown in FIG. 1.

Once the heated thermoplastic sheet 30 has been supported and elevated as shown in FIG. 1, the hydraulic devices 40 and 42 are actuated by suitable hydraulic motor means (not shown) to pull the support members in opposite directions as illustrated in FIG. 1. During such pulling operation, the end of the thermoplastic sheet 30 shown connected to the end 22b of the support member 22 is pulled along an arcuate path through a smaller arc than is the opposite end of the sheet 30 shown connected to the end 24b of the support member 24. The end of the thermoplastic sheet 30 connected to end 24b of the support member 24 travels an arcuate path substantially common to that of the opposed end connected to end 22b of the support member 22, but it travels through a greater arc and is maintained continually elevated substantially above the opposite end 22b. As the two opposed ends are pulled in opposite directions through the vertical plane, this elevated spaced and timed relationship is maintained as presented in dotted outline showing the thermoplastic sheet 30' in a stretched condition as it is pulled by the support members 22' and 24'.

Finally, the support member 22 is first to reach a horizontal position by engagement with the platform 10 whereas movement of the support member 24 stops after movement of the support member 22 ceases. In this way, movement of the supported ends of the thermoplastic sheet 30 in an arcuate path terminates when the opposed ends are in substantially horizontal coplanar relation. FIG. 3 illustrates the configuration of the thermoplastic sheet 30 after the stretching operation just detailed has been completed. At this point, the sheet is allowed to cool below its forming temperature and may then be released from the supports for further processing.

A graphical representation of the cross-section of the thermoplastic sheet 30 is shown in FIG. 5 prior to the stretching operation wherein the dotted line A–B theoretically indicates the line of cleavage of the molecular structure of the material. In other words, the point A indicates what might be the top of one end of the thermoplastic sheet 30 and the point B indicates an opposite point at the bottom of the sheet. After stretching, the thickness of the thermoplastic sheet 30 has decreased as shown in FIG. 6 and the line of cleavage has been altered as indicated by sliding of the points A and B. The change of the line of cleavage phenomena is due to the downward step 38 of each support member as shown in FIGS. 1A and 2A wherein the top of the thermoplastic sheet 30 must travel further than the bottom of the sheet during the stretching operation.

Physical evidence of the change of the line of cleavage as illustrated in FIG. 6 is provided by breaking a sample piece of thermoplastic sheet both before and after stretching. Thus if a bending moment is applied to the sheet prior to stretching treatment by the present invention, the sheet will break generally along the line A–B as shown in FIG. 5. If the bending moment stress is applied to the plastic sheet after treatment according to the present invention, the line of shear of the thermoplastic sheet 30 will more or less conform to the configuration of line A–B as in FIG. 6. The overall result of the stretching operation and the change of the line of cleavage is that the molecules of the sheet after stretching by the present invention have been reoriented which results in vastly increased strength of the material.

As an example typical of the present invention, a sheet of acrylic thermoplastic material one-quarter inch in thickness and comprised of about 41 square feet in surface area was heated to the forming temperature of 350° F. The sheet was subjected to the stretching operation just described whereby the surface area of the sheet was increased to 81 square feet without shearing or distortion. As a test of stretch of the material, a much greater force was required to break the material after stretching than was necessary before stretching.

Another preferred embodiment of the present invention is illustrated in FIGS. 7–10 wherein first and second elongate support members 100 and 102 respectively are secured such as by axles 104 for pivotal as well as sliding movement within slots 106 of dual frames 108 and 110 (FIG. 10). Secured at the ends of the axles 104 are leverage means such as levers 112, the outer ends of each of which are connected to cables 114. The cables 114 in turn are secured about winding drums 116. As illustrated in FIG. 10, each pair of drums 116 is mounted on a common shaft 118 which is rotatably driven by a suitable motor means 120. The dual frames 108 and 110 as well as the drums 116 on shafts 118 may be mounted on a suitable base as will be recognized by those skilled in the art.

With reference to FIG. 10, the support member 100 (the same is true of the support member 102 of FIGS. 7–9) is adapted to receive a clamping board 122 which is releasably secured such as by bolts 124. Once again, other suitable clamping means may be used to augment the securing of the clamping board 122 to the support member 100 (and support member 102 of FIGS. 7–9).

In operation, the sheet of thermoplastic material 130 to be stretched is heated to above its forming temperature and is secured at opposite ends to the elongate support members 100 and 102 by pressing engagement of each end thereof between the respective support members 100 and 102 and the clamping boards 122 by tightening of the bolts 124. The motor means 120 (FIG. 10) are then actuated to drive or supply a motive force to the cables 114 whereby the cables 114 exert a pulling action on the lever members 112. As shown in FIG. 8, such pulling action first causes the thermoplastic sheet 130 to tauten while the support members 100 and 102 rotate in opposite directions about the axles 104 which causes initial stretching of the sheet of thermoplastic 126 due to drawing of the ends of the sheet 130 about the surfaces 100a and 102a of the respective supports. As shown in FIG. 9, further pulling action by the cable 114 causes the sheet of thermoplastic material 126 to stretch since the pulling action forces the support members 100 and 102 apart in the horizontal plane.

After the desired degree of stretching has been effected by the pulling operation as shown in FIG. 9, the sheet of thermoplastic material 126 is allowed to cool below its forming temperature whereafter it may be released from the support members 100 and 102. By virtue of rotation of the support members 100 and 102 about the axles 104 as described in relation to FIG. 8, the line of cleavage across the cross-section of the sheet 126 has again been altered as graphically illustrated, for example, in FIG. 6. Thus surface area and rigidity of the sheet has been substantially increased with results similar to those enumerated in the embodiment first described herein.

It should be recognized that the cross-sectional configuration of the support members 100 and 102 as shown in FIGS. 7–9 may be varied and even may be circular so long as there are surfaces 100a and 102a of the respective supports whereby the top of the sheet 130 must travel further than the bottom of the sheet during stretching. This results in the change of the cleavage line as illustrated by FIG. 6. Also, it will be recognized that the arrangement of the support members 100 and 102 with the axles 104, the levers 112 and the cables 114 may be varied by use of gearing, etc. whereby the rotational function (FIG. 8) and pulling function (FIG. 9) can be accomplished by different means.

Thus provided are significantly improved methods and apparatuses for stretching sheets of thermoplastic material. As has been described, the operation may be effected by either the arcuate stretching technique or by the "rolling" operation either of which results in an increase of as much as 100% in surface area and an increase in structural strength of the sheet all without noticeable degradation of optical characteristics of the material.

The present invention, therefore, is well adapted to carry out the objects and attain the ends and advantages mentioned as well as those inherent therein. While presently preferred embodiments of the invention are given for the purpose of disclosure, numerous changes in the details of construction, arrangement of parts and operational details can be made which will readily suggest themselves to those skilled in the art and which are encompassed within the spirit of the invention and the scope of the appended claims.

What is claimed is:

1. An apparatus for stretching a sheet of thermoplastic material, comprising,
    a platform oriented in the horizontal plane,
    first and second support members, one end of each of which is pivotally secured to the platform for movement of the free end in the vertical plane and wherein the free end of each of said support members terminates at its outer transverse edge with a downwardly stepped surface,
    means for clamping opposed ends of the thermoplastic sheet to the free ends of each support member whereby the sheet extends over the downwardly stepped surface and is secured outwardly of said stepped surface, and
    drive means for moving the support members in opposite directions through the vertical plane in timed relationship.

2. The invention of claim 1 wherein the ends of the first and second support members pivotally secured to the platform are adjacently spaced.

3. The invention of claim 1 wherein the drive means for moving the support members through the vertical plane in timed relation includes,
   a motor, and
   means for drivingly coupling said motor means to the support members.

4. The invention of claim 1 wherein the ends of the first and second support members pivotally secured to the platform are adjacently spaced and wherein the drive means for moving the support members through the vertical plane in timed relation includes,
   a motor, and
   means for drivingly coupling said motor means to the support members.

References Cited

UNITED STATES PATENTS

| | | | |
|---|---|---|---|
| 2,515,830 | 7/1950 | Mahler | 18—1 (FS) UX |
| 2,873,474 | 2/1959 | Shields et al. | 18—1 (FS) |
| 2,912,716 | 11/1959 | Frownfelter et al. | 18—1 (FS) |

ROBERT L. SPICER, JR., Primary Examiner

U.S. Cl. X.R.

18—DIG 53